United States Patent [19]

Flamenbaum

[11] Patent Number: 5,638,807
[45] Date of Patent: Jun. 17, 1997

[54] CHARCOAL STARTER

[76] Inventor: Judith Flamenbaum, 60 Horatio St., New York, N.Y. 10014

[21] Appl. No.: 576,075

[22] Filed: Dec. 21, 1995

[51] Int. Cl.$^6$ .................................................. F24B 3/00
[52] U.S. Cl. ........................................ 126/25 B; 126/25 R
[58] Field of Search .................................... 126/25 B, 25 R

[56] References Cited

U.S. PATENT DOCUMENTS

| | | | |
|---|---|---|---|
| 3,167,040 | 1/1965 | Byars, Sr. et al. | 126/25 B |
| 3,884,214 | 5/1975 | Duncan | 126/25 B |
| 3,934,520 | 1/1976 | Brennan | 126/25 B |
| 3,974,821 | 8/1976 | Storandt | 126/25 B |
| 4,417,565 | 11/1983 | Karpinia | 126/25 B |
| 4,531,507 | 7/1985 | Gerson | 126/25 B |
| 4,909,237 | 3/1990 | Karpinia | 202/99 |
| 5,154,159 | 10/1992 | Knafelc et al. | 12/25 B |
| 5,197,455 | 3/1993 | Tessien | 126/25 B |
| 5,230,325 | 7/1993 | Jones | 126/25 B |

*Primary Examiner*—Carl D. Price
*Attorney, Agent, or Firm*—William D. Schmidt

[57] ABSTRACT

The present invention relates to an improved charcoal starter that employs a unique charcoal release system which permits the charcoal to be deposited into a barbecue through the bottom thereby eliminating the splashing of lighted ashes. The charcoal starter device uses wadded paper or other readily combustible, non-polluting material as a fire starter. The device has a housing having an inner and outer surface surrounding a central space open on the top and bottom. A heat shield is attached to the outer surface of the housing. A handle is attached to the heat shield. The housing has a plurality of apertures adjacent to the bottom of the housing. The unique release system employs a central post having a slidable push-bar wrapped around it. A two ended spring is positioned with one end below the push-bar and the other at the flared portion of the central post. The central post is portioned in the center of the inner space and connected to the inner surface of the housing by support bars. The slidable push-bar pushes up against a fold-able grate that holds the charcoal. Support pegs are positioned immediately below the grate and will retract upon activation by a wire connected to a trigger located in the handle area. Once this trigger is activated the support pegs are removed and the weight of the charcoal will cause the slidable push-bar to slowly compress the spring. The push-bar will descend and the grate will fold upon itself. Once completely folded the incandescent charcoal will fall out the bottom of the device and be deposited into the barbecue. This unique release system allows for efficient transfer of the incandescent charcoal to the barbecue without the splashing of lighted ashes.

12 Claims, 6 Drawing Sheets

CHARCOAL STARTER

BACKGROUND OF THE INVENTION

1. Field of the Invention

The present invention relates to portable charcoal starters and more particularly to charcoal starters having pre-combustion chambers and employing multiple apertures to accelerate the flow of air over the charcoal thereby producing faster ignition of the charcoal. When the charcoal is ready to be transferred to the outdoor grill the portable charcoal device is positioned over the grill and a trigger is activated thereby depositing the charcoal into the outdoor grill. The charcoal exits the charcoal starter device through the bottom when the grate is receded upon pulling of the trigger. The charcoal starter device reduces the splashing of lighted ashes which is a problem with prior art devices.

More particularly, the present invention relates to an improved charcoal device that releases the incandescent charcoal from the bottom of the device upon activation of a trigger. This unique mode of delivery reduces the possibility of burns or other injury caused by the splashing of lighted ashes when charcoal is poured into an outdoor grill as is required with the currently available charcoal devices.

2. Description of the Prior Art

Charcoal lighter devices are well known in the prior art. Charcoal lighter devices have been used in the past. Different shapes and designs have been used and in all cases there are problems associated with the delivery of the hot charcoal to the barbecue once they are in their incandescent state. With currently available devices the hot charcoal is delivered to the barbecue by pouting it into the grill. This mode of delivery causes splashing of hot ashes which can potentially cause burns to the user. U.S. Pat. No. 5,230,325 to Stanley J. Williams describes a charcoal starter device that utilizes waded paper to start the charcoal instead of petroleum fuels in a canister-like device. The device is insulated so that when it is lifted by the user to pour the lighted charcoal into the barbecue the insulated device is cool to the touch, thus reducing the chances for burns. However, this device does not employ any mechanism to compensate for the potential burns that can be caused by the hot ashes that splash upward once the charcoal is poured into the outdoor grill.

Numerous innovations for charcoal starter devices have been provided in the information disclosure statement. Even though these innovations may be suitable for the specific individual purposes to which they address, they fail to address the problem of splashing ashes and differ from the present invention as hereinafter contrasted.

Accordingly, it is provided in the present invention a charcoal starter with a novel charcoal release system for releasing the charcoal from the device once in the incandescent state. The advantage of this device over conventional charcoal starter devices is the elimination of splashing of lighted ashes when the charcoal is released into the fire bowl of a barbecue using the novel release system. This reduces the chances for potential harmful burning.

Numerous innovations for charcoal starter devices have been provided in the information disclosure statement that are adapted to be used. Even though these innovations may be suitable for the specific individual purposes to which they address, they are not be suitable for the purposes of the present invention as heretofore described.

SUMMARY OF THE INVENTION

The present invention has been accomplished to eliminate the aforesaid problems. The improved charcoal lighter device of the present invention satisfies all the foregoing needs. The device is substantially as set forth in the Abstract of the Disclosure.

It is thus the major object of the invention to provide an improved charcoal lighter device having a trigger, which when depressed activates a mechanism which releases the charcoal from the bottom of the device preventing hot ashes that splash upward once the charcoal is poured into the outdoor grill.

More particularly, the present invention provides a housing with a thermally insulated shield handle. The handle has a trigger, which when depressed activates a mechanism which releases the charcoal from the bottom of the device.

It is still another object of the invention to provide a housing having a concentric shell with an open top and an open bottom and closed upstanding interconnected sidewalls.

It is still yet another object of the invention to provide a housing which functions as a heating shell, and is preferably made of stainless steel or aluminum.

Yet another object of the invention is to provide a central heating space within the housing. Situated in the central heating space is a horizontal grate in which the charcoal briquettes are placed. The grate is hinged on it's diameter so that the grate can fold into two super imposed semi-circles when the support pegs are not in place. The grate is held in the open position when the push-bar, supported on a central post, is pressed up against the underside of the grate and the support pegs are set in place to support the grate. When the support pegs are removed the weight of the charcoal will cause the push-bar to slide down the central post and thus the grate will fold in two. This is considered the closed position. When the grate is in this position the charcoal that was resting on this grate will fall into the barbecue. No ashes will rise upward since the charcoal's descent occurred within the confines of the walls of the device.

The support pegs are connected to the trigger located in the handle by a wire. When the trigger is pulled away from the outer shell the wire will cause the support pegs to retract from under the grate thus causing the push-bar to descend down the central post. This will place the grate in the closed position. When the trigger is activated the fold-able grate folds into a semi-circle and the charcoal is released.

The portion of the housing below the grate has a plurality of aeration vents. The area located below the grate is the fuel area. This area is defined as the space between the inner surface of the housing that is resting on the barbecue and the bottom of the grate where the charcoal is placed. Here, combustible material such as newspaper can be inserted and ignited for firing the device. The material in this space can be ignited through one of the plurality of air vents at the bottom portion of the outside shell. These holes will provide for sufficient airflow to facilitate the combustion of the starter fuel and enable the charcoal to be subsequently lighted.

The device can be produced inexpensively and in a variety of sizes to accommodate various size barbecues. Although shown in the drawings as generally circular, it will be understood that these shells may be of any suitable geometric shape. Further features of the invention are set forth in the following detailed description and accompanying drawings.

BRIEF LIST OF REFERENCE NUMERALS UTILIZED IN THE DRAWING

10 - Charcoal Starter Device of the present invention 10
12 - Housing 12

12A - Outer surface of Housing 12A
12B - Inner surface of Housing 12B
13 - Handle 13
14 - Heat shield 14
15 - Trigger 15
16 - Wire 16
17 - Support Pegs 17
18 - Small spring 18
19 - Pivot arm 19
20 - Fulcrum 20
21 - Grate 21
21A - Hinge on grate 21A
22 - Push-bar 22
23 - Central Support Post 23
23A - Inner Support Post 23A
23B - Large Spring 23B
24 - Support Rods 24
25 - Charcoal 25
30 - Preferred Embodiment- Charcoal Starter Device 30
32 - Housing 32
32A - Outer surface of Housing 32A
32B - Inner surface of Housing 32B
33 - Handle 33
34 - Heat shield 34
35 - Trigger 35
36 - Wire 36
37 - Pulley #1-37
37A - Pulley #2-37A
37B - Pulley #3-37B
38 - Central Support Post 38
38A - Inner Support Post 38A
38B - Large Spring 38B
39 - Grate 39
39A - Hinge in Grate 39A
40 - Push-bar 40
50 - Full view 50
52 - Housing 52
54 - Heat shield 54
56 - Handle 56
58 - Trigger 58
59 - Apertures 59

DETAILED DESCRIPTION OF THE PREFERRED EMBODIMENT

Figure 1:
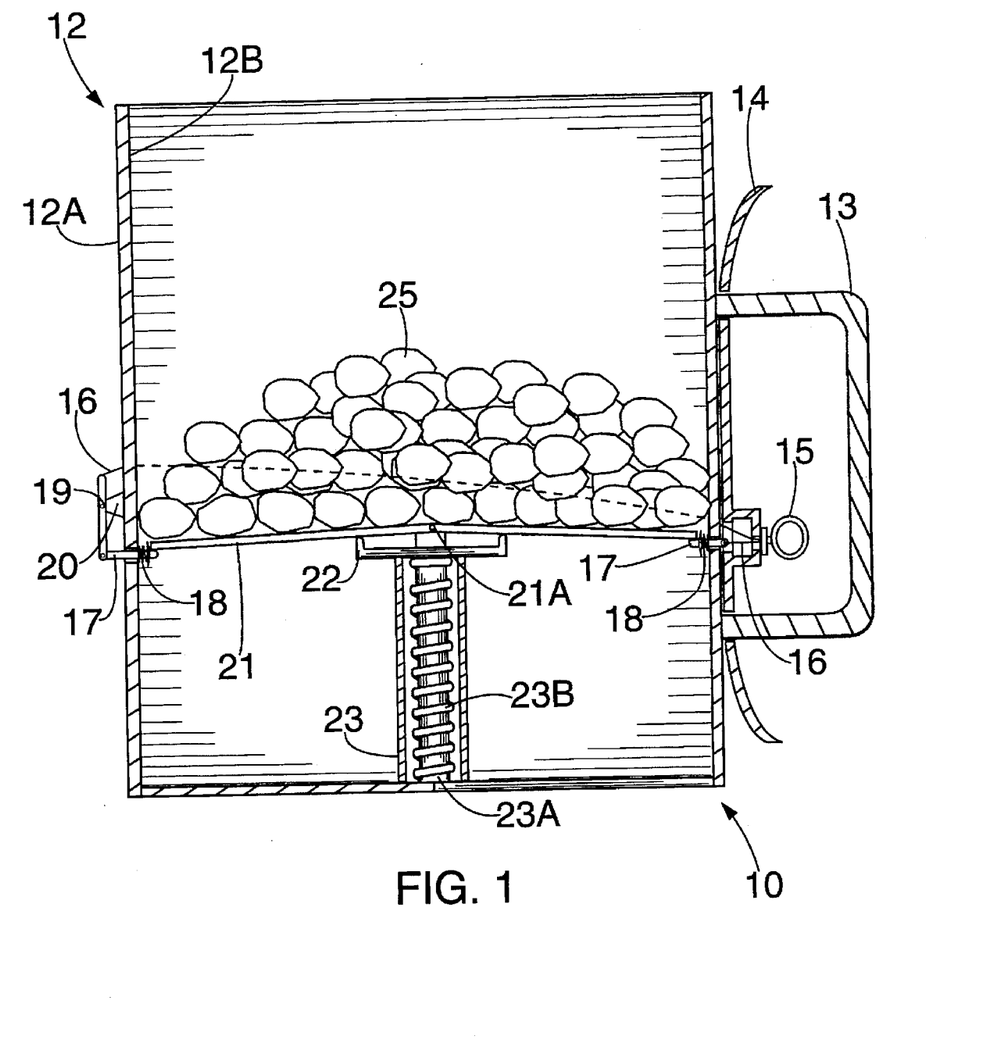
FIG. 1 is a partially non-sectional view of the most preferred embodiment of the charcoal starter device in the closed position.

Firstly, referring to FIG. 1 which is a partially non-sectional view of the most preferred embodiment of the charcoal starter device 10 in the closed position exhibiting the following features: 12 Housing having an outer surface 12A and an inner surface 12B; and Handle 13; and heat shield 14; and Trigger 15; and Wire 16; and Support Pegs 17; and Small springs 18; and Pivot arm 19; and Fulcrum 20; and Grate 21 shown in the closed position; and Hinge 21A on grate; and Push-bar 22; Central Support post 23; and Inner post 23A; and Large spring 23B; and Support rods 24.

Figure 2:
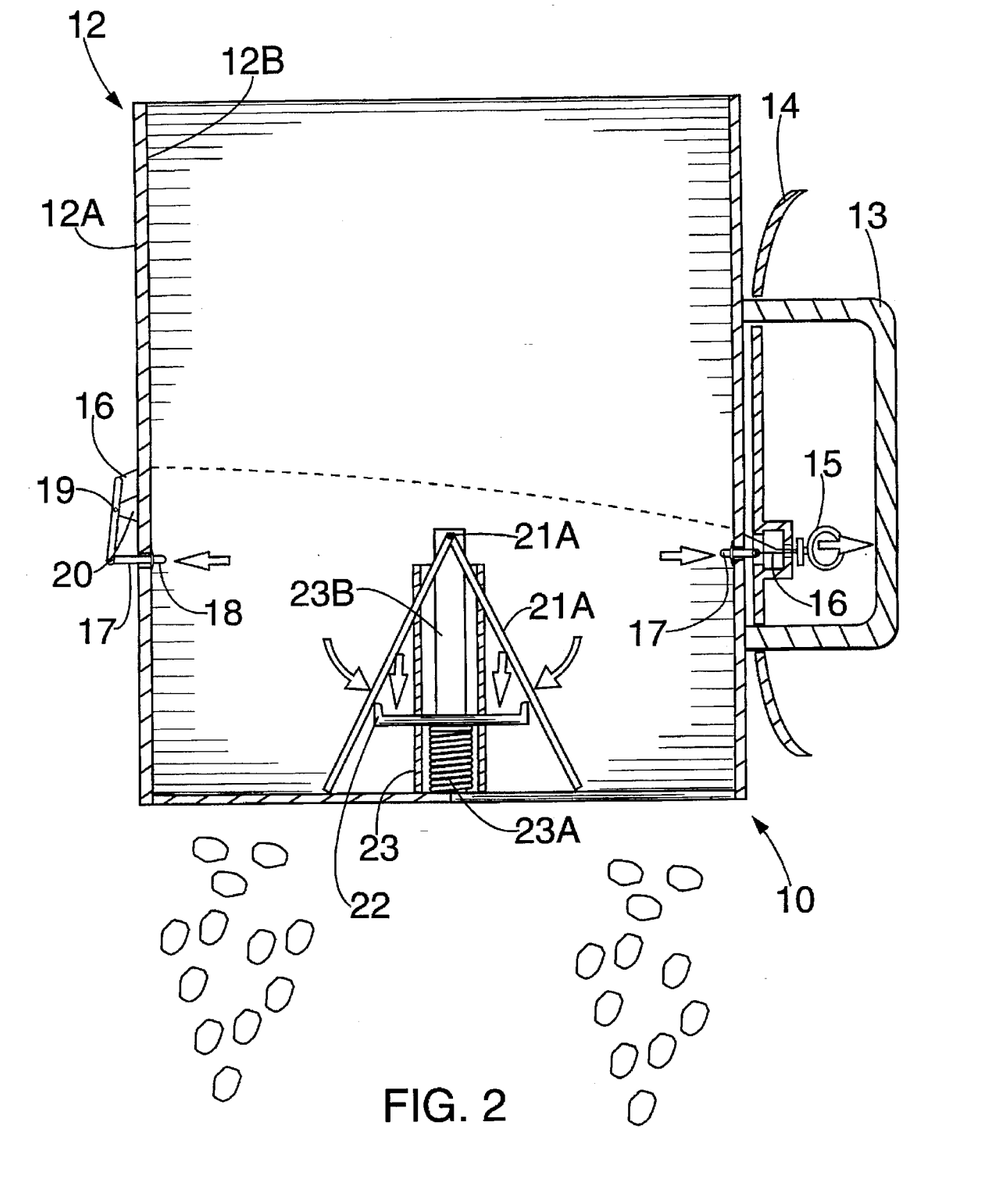
FIG. 2 is a partially non-sectional view of the most preferred embodiment of the charcoal starter device in the open position.

FIG. 2 is a partially non-sectional view of the most preferred embodiment of the charcoal starter device 10 in the open position having the exact features of FIG. 1. Specifically in this view the grate is in the open position. When in the open position grate 21 folds into two semi-circles on hinged diameter 21A, thus causing push-bar 22 to descend down central support post 23 and depress large spring 23A. The results of this event is the dispensing of the charcoal from the bottom of the device.

Figure 3:
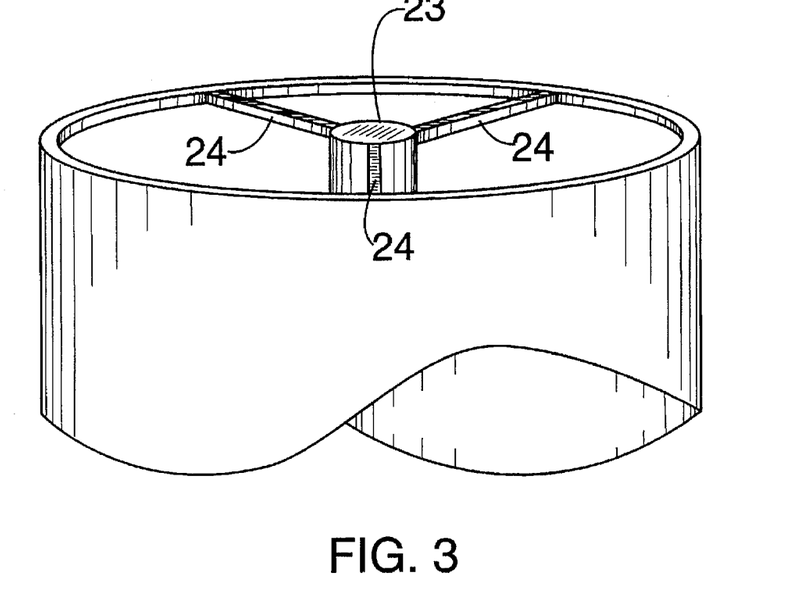
FIG. 3 is a underside partially non-sectional view of both the most preferred and preferred embodiment's lower portion of the charcoal starter device.

FIG. 3 is a partially non-sectional underside view of both the most preferred and preferred embodiments having the following features: 23 Central support post; and 24 Support rods. Specifically support rods 24 are attached to central support post 23 at one end and the inner surface 12B of the housing at the other end.

Figure 4:
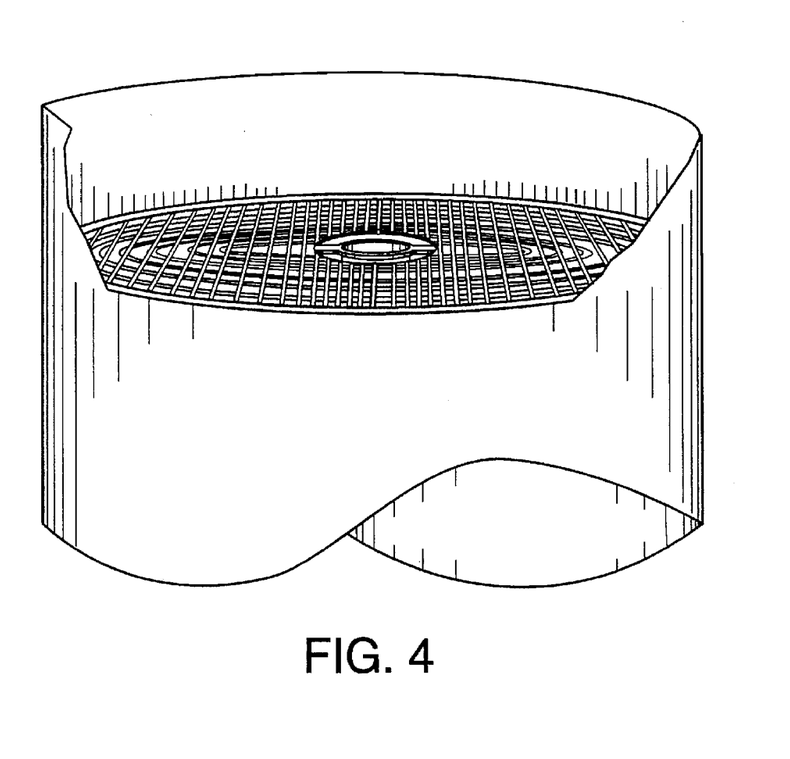
FIG. 4 is a partially non-sectional side view of the most preferred and preferred embodiment's grate.

FIG. 4 is a partially non-sectional side view of both the most preferred and preferred embodiments having the following features: Grate 21, having a hinged diameter 21A.

The most preferred embodiment of the charcoal starter device comprising a housing 12 is preferably constructed of stainless steel or aluminum or other material that can endure temperature above 450° F. The housing collectively defining a central space with an open top and bottom.

A thermally insulated Handle 13 is attached to heat shield 14 which together is attached to the outer surface of the housing 12A.

A trigger 15 is disposed within the handle resting against the Heat shield and is movably attached to wire 16. Wire 16 is movably attached to support peg 17 directly on proximately and to pivot arm 19 distally. Grate 21 rests upon support pegs 17 when in the closed position. Grate 21 has a hinged diameter 21A.

Grate 21 is attached to inner support post 23A which is within hollow central support post 23. Fitted around inner support post 23A is large spring 23B. Push-bar 22 is positioned so that it is in contact with the lower portion of grate 22 and the upper portion of spring 23B. Push-bar 22 can ascend and descend on hollow central support post 23.

Figure 7:
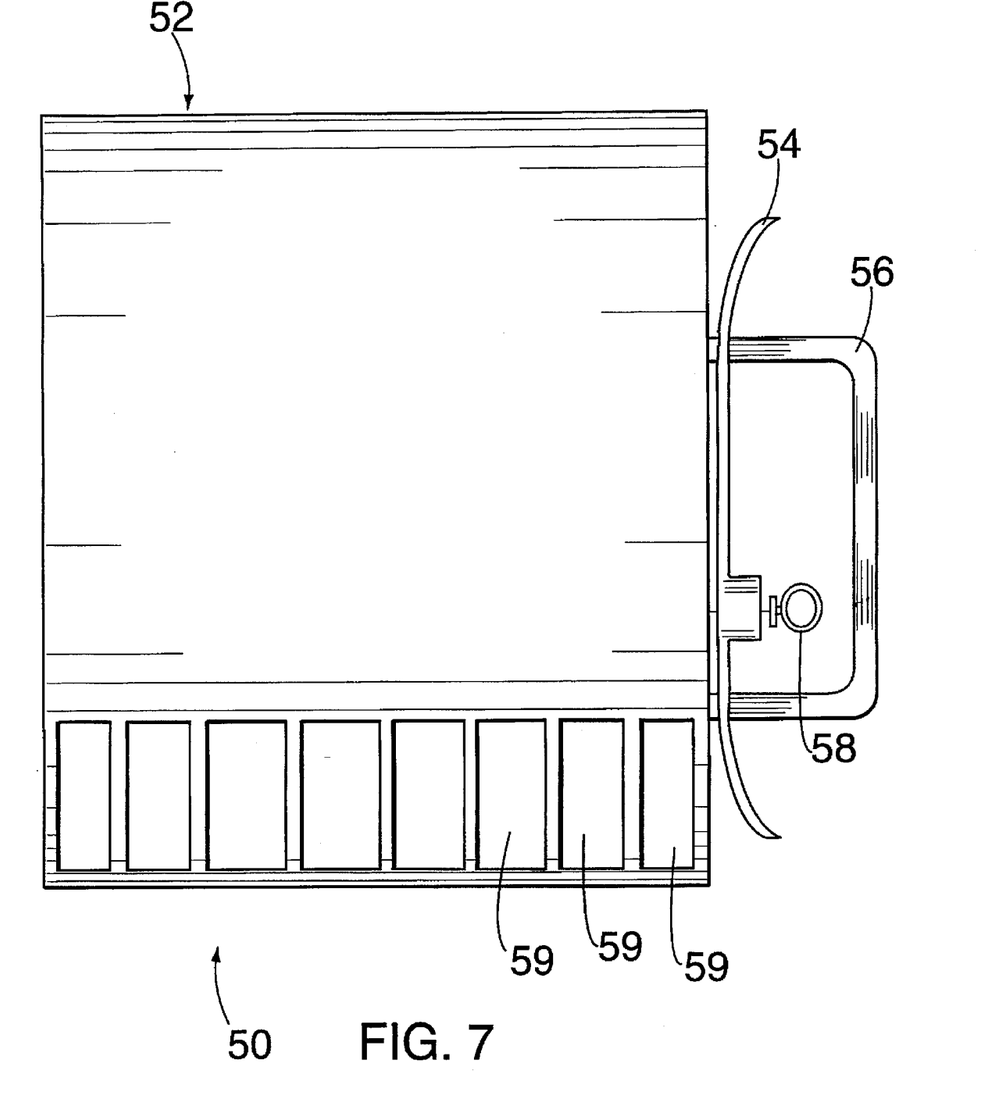
FIG. 7 is a front perspective view of the most preferred and preferred embodiment of the charcoal starter device.

The area around the central support post 23 below the grate 21 and inner wall 12B forms the fuel chamber. In this chamber solid fuel can be placed and ignited. The solid fuel can be placed and ignited in the fuel chamber through the plurality of apertures 59. Apertures 59 also provide for efficient ignition of the solid fuel and subsequent lighting of the charcoal bringing them to an incandescent state within minutes.

When the charcoal has reached the desired incandescent state trigger 15 is pulled away from heat shield 14 where it will pull on wire 16.

When wire 16 is pulled in this direction it will pull proximate support peg 17 in the same direction. Simultaneously, wire 16 will pull pivot arm 19 in the same direction as the trigger movement thereby causing distal support peg 17 to be pulled out from under grate 21.

Once the support pegs are removed the weight of the charcoal will cause grate 21 to fold on it's hinged diameter resulting in a semi-circle configuration. Upon folding, grate 21 will cause push-bar 22 to descend down central support post 23 thus depressing spring 23B. This movement will allow for the gradual folding of grate 21 resulting in the dispensing incandescent charcoal from the bottom of the device into the barbecue.

This mechanism of release will eliminate splashing of lighted charcoal ashes, a problem with existing charcoal starter devices.

Once the charcoal has been released the device is turned upside down so as to reset grate 21 in the open position. When trigger 15 is released small springs 18 cause support pegs 17 to reset. When reset, grate 21 will once again rest on the support pegs when turned right side up and the charcoal starter device is now ready to be used again.

DETAILED DESCRIPTION OF THE PREFERRED EMBODIMENT

Figure 5:
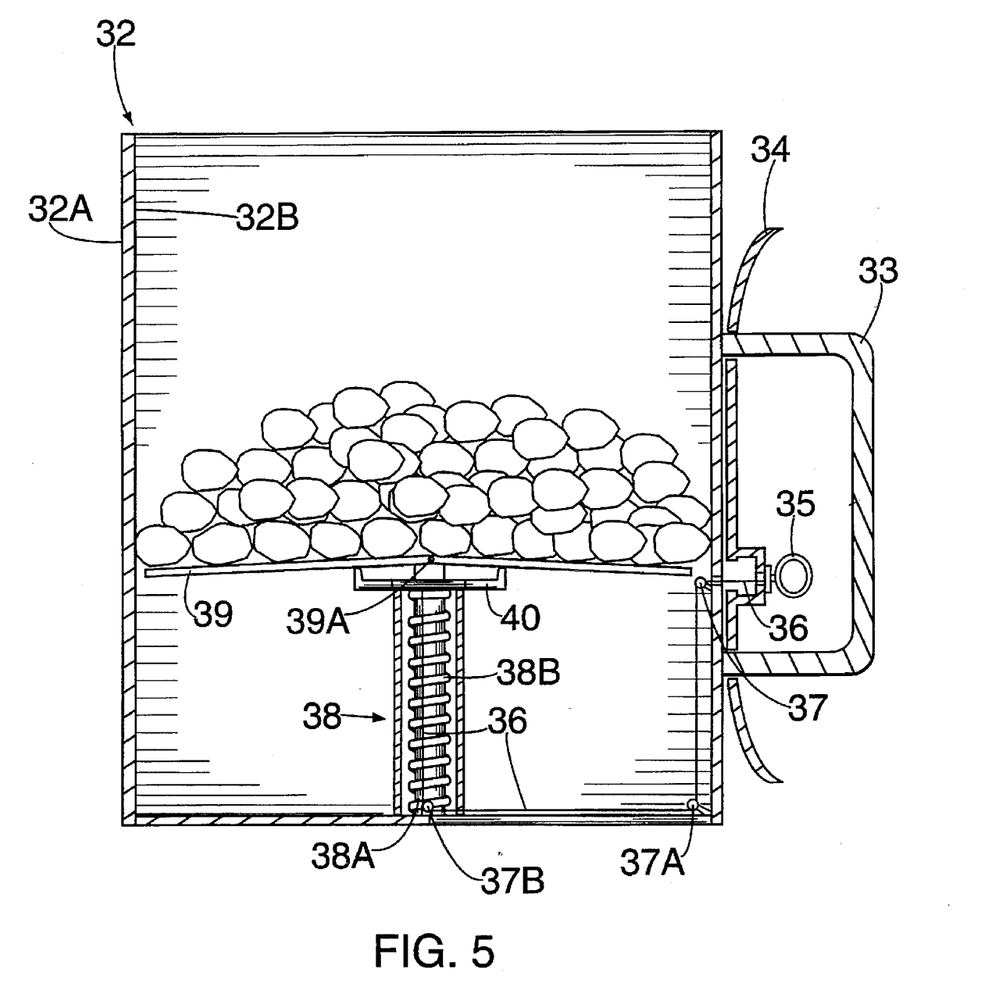
FIG. 5 is a partially non-sectional view of the preferred embodiment of the charcoal starter device in the closed position.

Now, referring to FIG. 5 is a partially non-sectional view of the preferred embodiment in the closed position having the following features: housing 32 having an outer surface 32A and inner surface 32B; and handle 33; and; heat shield 34; and trigger 35; and wire 36; and pulley #1 37; and pulley #2 37A; and pulley #3 37B; and Central support post 38; and inner support post 38A; and large spring 38B; and grate 39; and hinged diameter of grate 39A; and push-bar 40.

Figure 6:
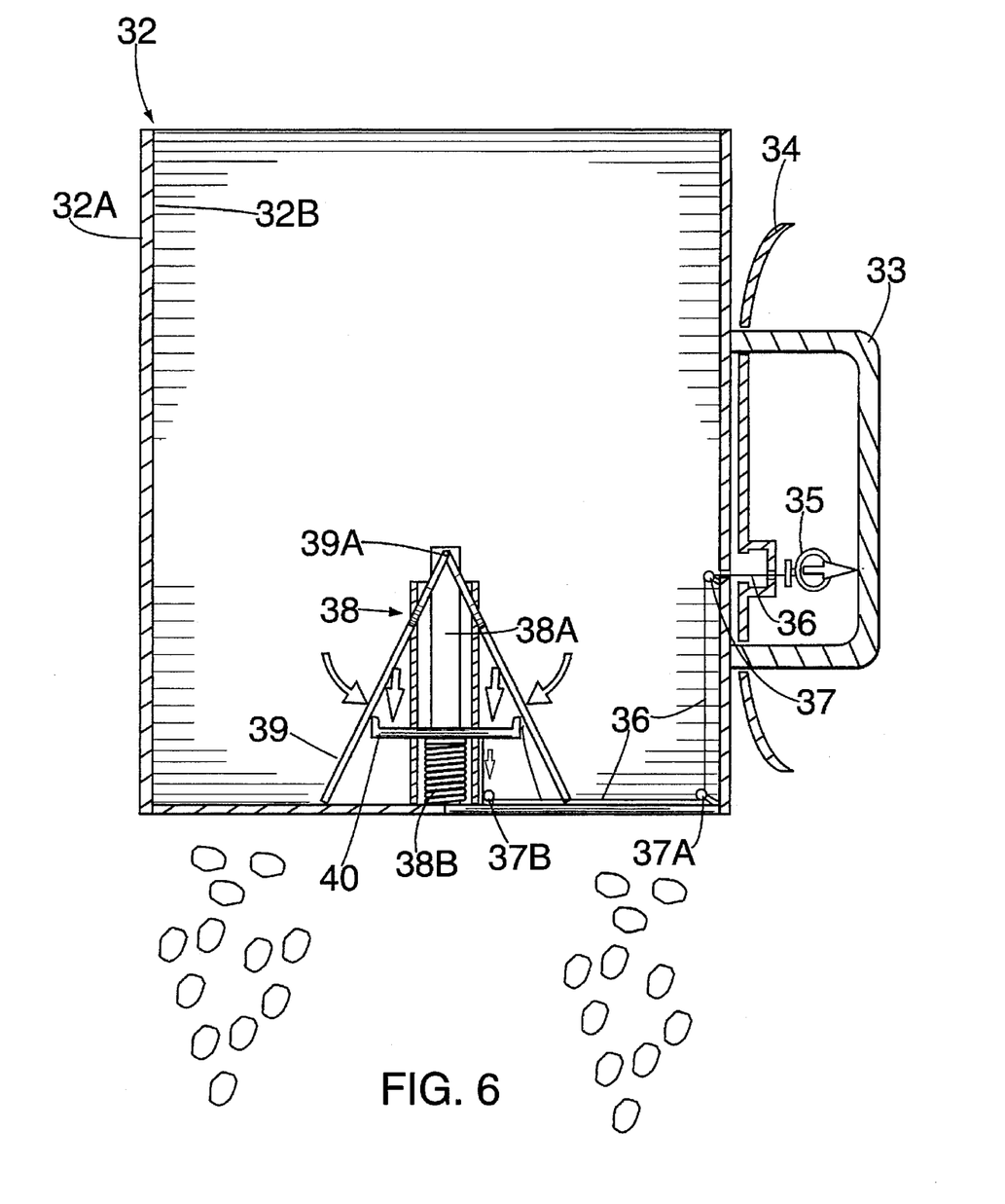
FIG. 6 is a partially non-sectional view of the preferred embodiment of the charcoal starter device in the open position.

FIG. 6 is a partially non-sectional view of the preferred embodiment in the open position exhibiting all of the features of FIG. 5. Specifically grate 39 is in the open position. When in the open position, grate 39 folds into two semi-circles on hinged diameter 39A, thus causing push-bar 40 to descend down central support post 38 and depress large spring 38B. The result of this event is the dispensing of the charcoal from the bottom of the device.

Referring to FIG. 7 is a front perspective view of the most preferred and preferred embodiment having the following features: 52 housing; and 54 heat shield; and 56 handle; and 58 Trigger; and 59 Apertures.

The preferred embodiment of the charcoal starter device comprising a housing 32 is preferably constructed of stainless steel or aluminum. The housing collectively defining a central space with an open top and open bottom.

A thermally insulated Handle 33 is attached to heat shield 34 which together is attached to the outer surface of the housing 32A. A trigger 35 disposed within handle 33 resting against the heat shield 34 and is movably attached to wire 36. Wire 36 is threaded around pulley #1 37, pulley #2 37A, and pulley #3 37B which is movably attached to the lower portion of push-bar 40. Grate 39 rests upon push-bar 40 which is held open by the torque on large spring 38B. Grate 39 has a hinged diameter 39A.

Grate 39 is attached to inner support post 38A which is within hollow central support post 38. Fitted around inner support post 38A is large spring 23B. Push-bar 40 is positioned so that it is in contact with the lower portion of grate 39 and the upper portion of spring 38B. Push-bar 40 can ascend and descend on hollow central support post 38B.

The area around the central support post 38 below the grate 39 and within inner wall 32B forms the fuel chamber. In this chamber solid fuel can be placed and ignited. The solid fuel can be placed and ignited in the fuel chamber through the plurality of apertures 59. Apertures 59 also provide for efficient ignition of the solid fuel and subsequent lighting of the charcoal bringing them to an incandescent state within minutes.

When the charcoal has reached the desired incandescent state trigger 35 is pulled away from heat shield 34 causing it to tug on wire 36. When wire 36 is pulled in this direction it will pull wire 36 in the same direction. This will result in pulling down on push-bar 40 and the depression of large spring 38B. Grate 39 holding the incandescent charcoal will then fold on it's hinged diameter 39A causing the charcoal to exit the charcoal starter device out the bottom. Grate 39 will automatically rest to the open position once trigger 35 has been released.

This method of dispensing the charcoal will allow the charcoal to exit the device into the barbecue without splashing of lighted ashes. This novel release system drastically reduces flying lighted ashes and therefore reduces the chance of fires and burns to the user resulting from such ashes.

This device can come in many shapes and sizes and can be used for other cooking material such as wood chips and the like. The device is inexpensive, light weight, efficient and easy to use. It is understood that each part of the charcoal starter device can be made preferably of steal or aluminum and other material that can endure temperature above 450° F.

It will be understood that each of the elements described above, or two or more together, may also find a useful application in other types of constructions differing from the type described above.

While the invention has been illustrated and described as embodied in a charcoal starter device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed:

1. An improved charcoal starter device comprising:
   a) a housing having an outer and inner surface, the housing having sidewalls defining an open top and an open bottom, and a series of spaced apertures therethrough adjacent to the bottom;
   b) a handle affixed to the outer surface of the housing;
   c) a central hollow post having an upper and lower portion;
   d) a plurality of support bars having two ends with the first end attached to the central hollow post and the second end attached to the inner surface of the housing;
   e) an inner support post having an upper and lower portion positioned within the central hollow post;
   f) a descendible push-bar wrapped around the central hollow post, the push-bar having an under portion;
   g) a spring having two ends surrounding the central hollow post with the first end of the spring positioned against the under portion of the push-bar and the second end of the spring positioned against the lower portion of the inner support post;
   h) a two piece circular grate having a diameter hinged at the diameter and connected to the upper portion of the central hollow post at the hinge;
   i) a plurality of retractable support pegs that are positioned to support the grate as a circle;

j) a trigger attached to the heat shield so as to align with one of the retractable support pegs;

k) a pivot arm having two ends with the first end of the pivot arm connected to the outer surface of the housing by a fulcrum with the second end of the pivot arm connected to the retractable support peg;

l) a wire having two ends with the first end connected directly to the support peg and the second end of the pivot arm and the second end of the wire connected to the trigger whereby the pulling of the trigger pulls the wire which retracts the support pegs causing the grate to fold into a semi circle thus causing the push-bar to descend and compress the spring.

2. An improved charcoal starter device comprising:

a) a housing having an outer and inner surface, the housing having sidewalls defining an open top and an open bottom, and a series of spaced apertures therethrough adjacent to the bottom;

b) a handle affixed to the outer surface of the housing;

c) a central hollow post having an upper and lower portion;

d) a plurality of support bars having two ends with the first end attached to the central hollow post and the second end to the inner surface of the housing;

e) an inner support post having an upper and lower portion positioned within the central hollow post;

f) a descendible push-bar wrapped around the central hollow post, the push-bar having an under portion;

g) a spring having two ends surrounding the central hollow post with the first end of the spring positioned against the under portion of the push-bar and the second end of the spring against the lower portion of the inner support post;

h) a two piece circular grate having a diameter hinged at the diameter and connected to the upper portion of the central hollow post at the hinge;

i) a plurality of pulleys attached to the inner surface of the housing below the grate;

j) a trigger attached to the heat shield;

k) a wire having two ends with the first end connected to the trigger, threaded to the pulleys and the second end of the wire attached to the lower portion of the push-bar.

3. The device of claim 1 wherein a heat shield is positioned between the outer surface of the housing and the handle.

4. The device of claim 2 wherein a heat shield is positioned between the outer surface of the housing and the handle.

5. The device of claim 3 wherein the housing and the grate is rectangular in shape.

6. The device of claim 4 wherein the housing and the grate is rectangular in shape.

7. The device of claim 5 wherein the handle comprises grip formed plastic disposed around metal.

8. The device of claim 6 wherein the handle comprises grip formed plastic disposed around metal.

9. The device of claim 7 wherein the housing has two oppositely faced large apertures adjacent to the bottom housing making the placing and ignition of the starting material easier.

10. The device of claim 8 wherein the housing has two oppositely faced large apertures adjacent to the bottom housing making the placing and ignition of the starting material easier.

11. The device of claim 9 wherein the housing is made from metals selected from the group consisting of stainless steel or aluminum.

12. The device of claim 10 wherein the housing is made from metals selected from the group consisting of stainless steel or aluminum.

* * * * *